Feb. 23, 1954     R. E. REEVE     2,670,009
VALVE

Filed May 8, 1951     2 Sheets-Sheet 1

INVENTOR
Robert E. Reeve

BY
ATTORNEYS

Feb. 23, 1954     R. E. REEVE     2,670,009
VALVE
Filed May 8, 1951     2 Sheets-Sheet 2
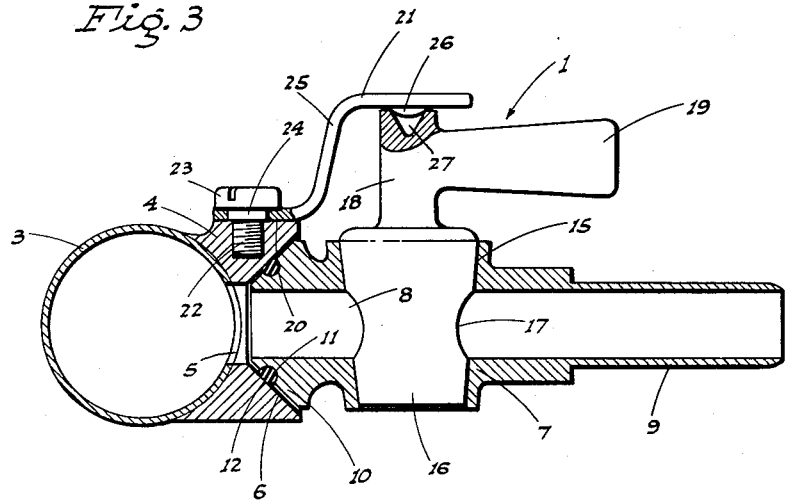
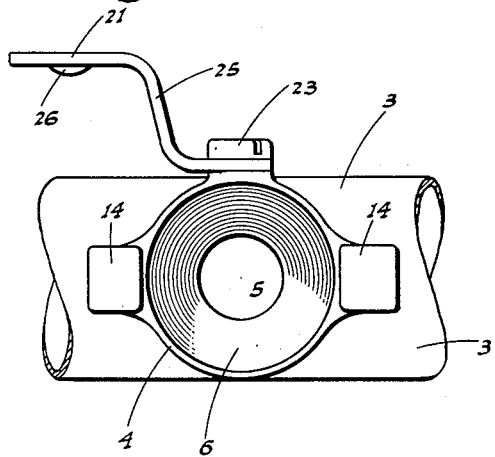
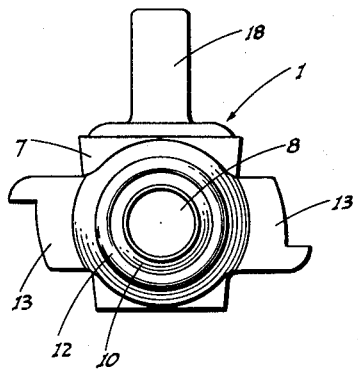
INVENTOR
Robert E. Reeve
BY *Webster & Webster*
ATTORNEYS

Patented Feb. 23, 1954　　　　　　　　　　　　　　　　2,670,009

UNITED STATES PATENT OFFICE 2,670,009

VALVE

Robert E. Reeve, Tracy, Calif.

Application May 8, 1951, Serial No. 225,088

1 Claim. (Cl. 137—738)

This invention relates generally to an improvement in valves.

In particular the invention is directed to, and it is an object to provide, a novel valve for use in dairies or the like.

Another important object of the present invention is to provide a valve which is especially designed, but not limited, for use in connection between a milk feed hose and a pipe line in a continuous milking system.

An additional object of the invention is to provide a valve, as above, which comprises a plurality of parts which are separable for the purpose of convenience and effective washing and sterilization of the same; such parts being arranged for ready and quick separation or coupling, manually.

A further object of the invention is to provide a valve for the purpose described which includes a novel quick-coupling and sealing unit between one part fixed to the pipe line of the milking system, and another part which connects to the milk feed hose; the latter part having a plug valve associated therewith to control liquid flow through the device.

It is also an object of the invention to provide a valve which is designed for ease and economy of manufacture.

Still another object of the invention is to provide a practical and reliable valve, and yet one which will be exceedingly effective for the purpose for which it is designed.

These objects are accomplished by means of such structure and relative arrangement of parts, as will fully appear by a perusal of the following specification and claim.

In the drawings:

Fig. 3 is a longitudinal sectional elevation of the valve.

Fig. 4 is an end view of the fixed body part looking toward the wide angle taper seat.

Fig. 5 is an inner end view of the separable body part looking toward the frusto-conical coupling head.

Figure 1:
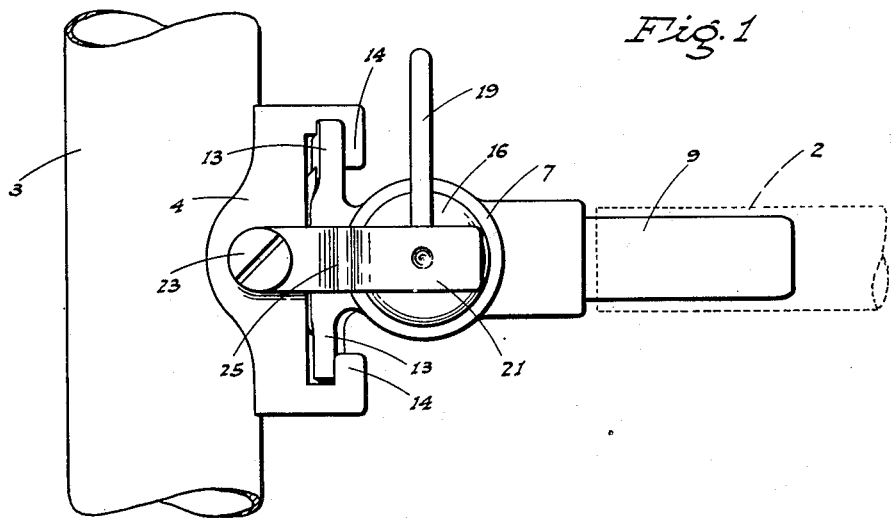
Fig. 1 is a plan view of the valve with all the parts in engagement, as for use.
Figure 2:
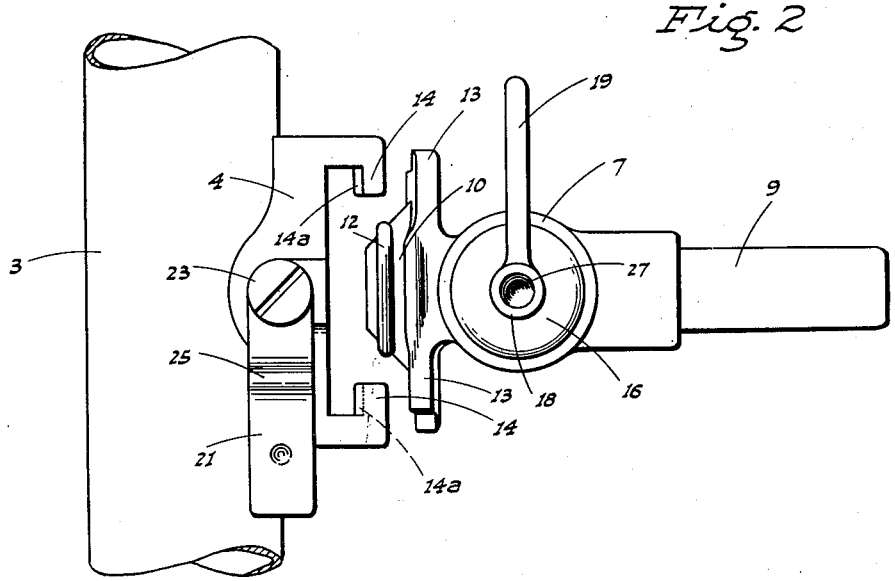
Fig. 2 is a similar view, but shows the parts of the coupling and sealing unit separated.

Referring now more particularly to the characters of reference on the drawings, the valve, which is indicated generally at 1, is adapted to connect and establish communication between a milk feed hose 2 and the fixed pipe line 3 of a continuous milking system in a dairy.

The valve 1 comprises a body part 4 fixed to the pipe line 3 and projecting laterally therefrom; such body part 4 including an axial bore 5 which communicates with the interior of the pipe line 3.

The axial bore 5 runs straight for a short distance from the pipe line 3 and then flares to form a wide angle taper seat 6.

The numeral 7 indicates an elongated separable body part having an axial passage 8 extending therethrough; the outer end portion of said separable body part 7 being formed as an attachment neck 9 on which the hose 2 is fitted.

At its inner end the separable body part 7 is formed with a frusto-conical coupling head 10 adapted to engage in matching relation in the wide angle taper seat 6 of the fixed body part 4.

The frusto-conical coupling head 10 is formed, in the face thereof, with an annular channel 11 in which a ring seal 12 is disposed; said ring seal 12 preferably being substantially circular in cross section whereby to normally project out of the annular channel 11.

When the frusto-conical coupling head 10 is forcefully engaged in the wide angle taper seat 6, the ring seal 12 compresses against such seat in sealing relation to the parts; the passage 8 then being in communication with the straight inner end portion of the axial bore 5.

The following mechanism is employed for quick-detachably coupling the head 10 in the taper seat 6:

The separable body part 7 is formed, immediately outwardly of the head 10, with opposed laterally projecting, locking dogs 13 which engage in corresponding outwardly projecting, laterally inwardly opening hooks 14 formed on the fixed body part 4 beyond opposite sides of the taper seat 6.

The working faces 14a of the hooks 14 are oppositely cam-inclined, and there being substantially matching inclination of the corresponding faces of the locking dogs 13. Upon engagement of the head 10 in the taper seat 6 and subsequent part-rotation of the body part 7 to engage the dogs 13 from behind the hooks 14 from an initial rotative position clear thereof, said cam-inclined faces urge the body part 7 axially inwardly, forcefully engaging the head 10 in said seat 6, with the ring seal 12 under relatively high compression.

While the parts are normally held in forceful engagement, as above, they can be quickly detached manually merely by the simple expedient of part-rotation of the body part 7, and re-engagement is accomplished with equal ease.

The separable body part 7 is formed with a substantially vertical-axis taper bore 15 extending therethrough and in which taper bore a removable taper plug valve 16 is engaged in matching relation. The taper plug valve 16 has a cross bore 17 therethrough whereby in one rotative position of said plug valve, communication is established through the passage 8, and in another position such passage is blocked. The taper plug valve 16 is formed at its upper end with a stem 18 having a radial handle 19 thereon, such handle being parallel to the axis of the body part 7 when said plug valve 16 is open.

The following arrangement is provided to normally prevent axially upward displacement of the plug valve 16 and its accidental escape from the taper bore 15.

The fixed body part 4 is formed on top with a flat seat 20, and the inner end of a laterally swingable hold-finger 21 is pivoted against said seat by a screw 22 having a head 23 and a neck 24 which passes through the finger 21.

The head 23 engages the adjacent end of the finger 21 with sufficient friction to maintain said finger against lateral loose-play by permitting of lateral swinging by hand of the finger 21.

Intermediate its ends the finger 21 is upwardly offset, as at 25, and the horizontal, outer end portion of such finger is formed with a downwardly projecting detent 26 which snap-engages in a recess 27 in the upper end of the stem 18 of taper plug valve 16.

With this arrangement the taper plug valve 16 is normally maintained in position in the taper bore 15, although the radial handle 19 may be manipulated to open or close said valve. However, when the separable body part 7 is part-rotated to quick-detach it from the fixed body part 4, the finger 21 is swung laterally aside and the detent 26 escapes the recess 27. Thus, the separable body part 7 can be uncoupled from the fixed body part 4 without obstruction, and with the finger 21 clear of the stem 18 the taper plug valve 16 may be withdrawn from the taper bore 15.

As a consequence, the parts of the device can be quick-detached for washing and sterilization after completion of each milking operation, and then easily reassembled by hand.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

A valve comprising a body part having a bore, the body being formed with a seat about one end of the bore, an initially separate body part having an axial passage therethrough, a coupling head on one end of the initially separate body part having a cooperating seat formed thereon at its outer end about the axial passage, means quick-releasable upon part-rotation of said initially separate body part to secure the parts together with the seats engaged, said separate body part having a taper bore thereacross, a taper plug valve removably engaged in said taper bore, a spring finger adapted to extend from the first named body part to overhang and engage the outer end of the plug, means pivoting the finger on the first named body part for rotation in a direction to allow the finger to be swung aside for the removal of the valve and separately the rotation of the separate body part in a disconnecting direction, and cooperating means between the outer end of the plug valve and the finger tending to prevent rotation of the separate body part without preventing rotation of the plug valve.

ROBERT E. REEVE.

References Cited in the file of this patent

UNITED STATES PATENTS

| Number | Name | Date |
|---|---|---|
| 209,380 | Connelly | Oct. 29, 1878 |
| 322,286 | Hemje | July 14, 1885 |
| 767,843 | Smith | Aug. 16, 1904 |
| 831,060 | Grunfeld | Sept. 18, 1906 |
| 1,622,216 | Anlauf | Mar. 22, 1927 |
| 1,695,207 | Sangster | Dec. 11, 1928 |
| 1,846,865 | Hapgood | Feb. 23, 1932 |
| 2,258,017 | King | Oct. 7, 1941 |

FOREIGN PATENTS

| Number | Country | Date |
|---|---|---|
| 38 | Great Britain | of 1879 |
| 11,597 | Great Britain | of 1905 |